(12) United States Patent
Klingler et al.

(10) Patent No.: US 7,958,977 B2
(45) Date of Patent: Jun. 14, 2011

(54) SEGMENT BRAKE

(76) Inventors: Gunter Klingler, Oberostendorf (DE); Harald Weiss, Stottwang (DE); Johann Eberle, Irsec (DE); Christoph Dropmann, Kaufbeuren (DE)

( * ) Notice: Subject to any disclaimer, the term of this patent is extended or adjusted under 35 U.S.C. 154(b) by 62 days.

(21) Appl. No.: 11/920,447

(22) PCT Filed: May 17, 2006

(86) PCT No.: PCT/EP2006/004694
§ 371 (c)(1),
(2), (4) Date: Feb. 20, 2009

(87) PCT Pub. No.: WO2006/136246
PCT Pub. Date: Dec. 28, 2006

(65) Prior Publication Data
US 2009/0218182 A1  Sep. 3, 2009

(30) Foreign Application Priority Data
May 18, 2005  (DE) .................. 10 2005 022 898

(51) Int. Cl.
*B60T 13/04* (2006.01)
(52) U.S. Cl. ............................. 188/171; 310/77; 310/93
(58) Field of Classification Search ........ 188/71.1–71.5, 188/73.2, 156, 161, 163, 171, 187; 310/77, 310/93
See application file for complete search history.

(56) References Cited

U.S. PATENT DOCUMENTS

| | | | |
|---|---|---|---|
| 3,605,958 A * | 9/1971 | McCarthy | 188/171 |
| 4,515,251 A | 5/1985 | Wruk | |
| 5,057,728 A * | 10/1991 | Dammeyer et al. | 310/77 |
| 5,944,150 A * | 8/1999 | Hikari | 188/161 |
| 6,202,804 B1 * | 3/2001 | Dropmann et al. | 188/171 |
| 6,237,730 B1 * | 5/2001 | Dropmann et al. | 188/171 |
| 6,675,939 B2 * | 1/2004 | Maurice et al. | 188/171 |
| 2009/0166136 A1 * | 7/2009 | Eberle et al. | 188/171 |

FOREIGN PATENT DOCUMENTS

| | | |
|---|---|---|
| DE | 3400675 A1 | 7/1984 |
| DE | 4221983 A1 | 1/1994 |
| DE | 4225158 A1 | 2/1994 |
| DE | 19814042 C1 | 7/1999 |
| DE | 19807654 A1 | 8/1999 |
| DE | 10006255 A1 | 8/2001 |
| EP | 0961047 A2 | 12/1999 |
| EP | 1715564 A2 | 10/2006 |
| WO | WO 01/59317 A1 | 8/2001 |

* cited by examiner

*Primary Examiner* — Christopher P Schwartz

(57) ABSTRACT

The invention relates to a mounting of one or more electromagnetically bleeding spring-loaded brakes (a, b) on a machine wall or the like. The invention is characterized in that the brakes are, while distributed over the periphery on the face, act upon an axially moving brake rotor (5) with continuous friction linings (6) on both sides (i.e. left and right), whereby braking (left) surface of the friction lining (6) and on the opposite side with the armature discs of the brakes on the second (right) friction lining (6).

8 Claims, 8 Drawing Sheets

SEGMENT BRAKE

PRIOR ART

Applicant's own DE 19807654 A1 discloses an electromagnetic spring-loaded brake comprising an annular coil carrier, a coil and a friction lining coupled through an intermediate disc with the armature disc of the electromagnetic spring-loaded brake adapted to engage a rotating element radially from the outside, i.e. at a peripheral surface, or radially from the inside or at one of the end faces of said element so as to retard the latter. Also, it is stated (claim 4) that two such brakes, for example, may be used to engage the rotating disc. Further, it is pointed out in claim 9 that the rotating element 12 may be a cable drum of an elevator system or the rotor of an elevator motor.

It has been known by DE 3 400 675 C2 that the coil carrier for mounting the coil may be shaped to be rectangular, not just circular. Applicant's own WO 0159317 A1 shows in FIG. 5 that in an electromagnetic (solenoid-operated) spring-loaded brake the electromagnetic coil 12a, 12b may be a two-part kidney-shaped component—this because an additional two-part armature disc provides a dual-circuit (segmented) feature, with the available coil space being used in an optimum manner. Further, the possibility exists of introducing a so-called oval coil into the coil carrier.

OBJECT

Starting out from document DE 19807654 A1, it is the object of the present invention to provide for further improvement of a brake engaging an end face of a rotating element.

SOLUTION

The desired optimization is obtained by not fixedly coupling the friction lining with the armature disc, which would result in the availability of a single friction face only, but by providing the rotating element with a pair of (right and left) friction linings, resulting in two friction faces, and by coupling the element axially through splines with a splined hub to be axially movable thereon. As a result, the brake's armature disc exerts pressure upon the rotating element, whereby an additional second friction face is provided to generate twice the original braking torque. In designing the coil carrier, two rectangular shapes were selected to accommodate an oval coil each; alternatively, two circular coils may be placed one above the other to save space.

As another possibility, a plurality of circularly shaped spring-loaded brakes were distributed along the periphery so as to exert pressure onto the rotor at its friction linings, resulting in a most diversely variable torque by varying the number of the brakes "active" at any one time.

DESCRIPTION

Figure 1:
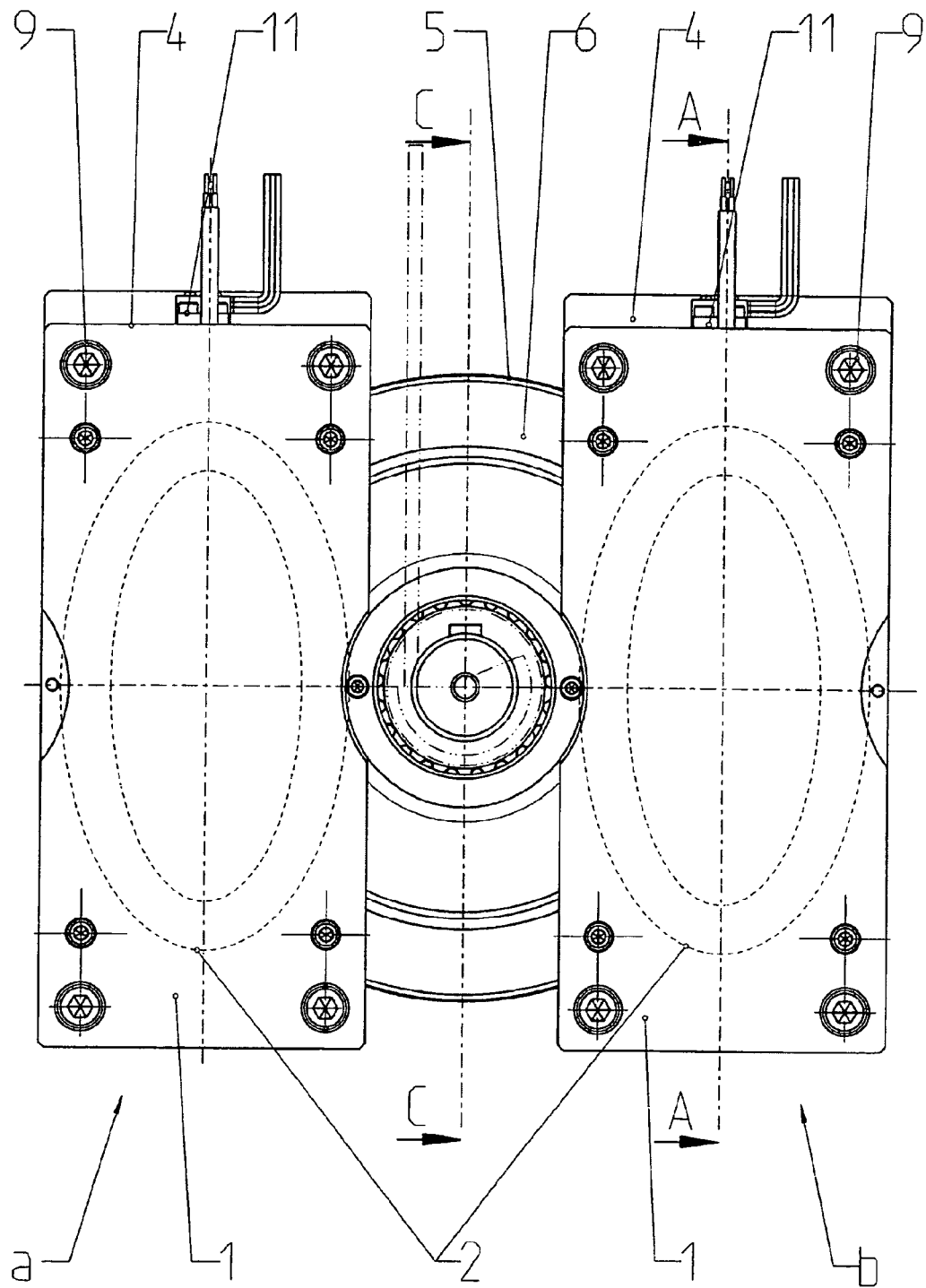
FIG. 1 shows lefthand brake "a" and righthand brake "b", which are symmetrically arranged and are described as a single structural unit in what follows.

FIG. 1 shows both brakes "a", "b" acting on a rotor 5 having a friction lining 6. This provides the brake with a dual-circuit feature as required for elevator systems (translator's note: "dual-circuit" means two parts of the brake which work independently of each other).

Figure 2:
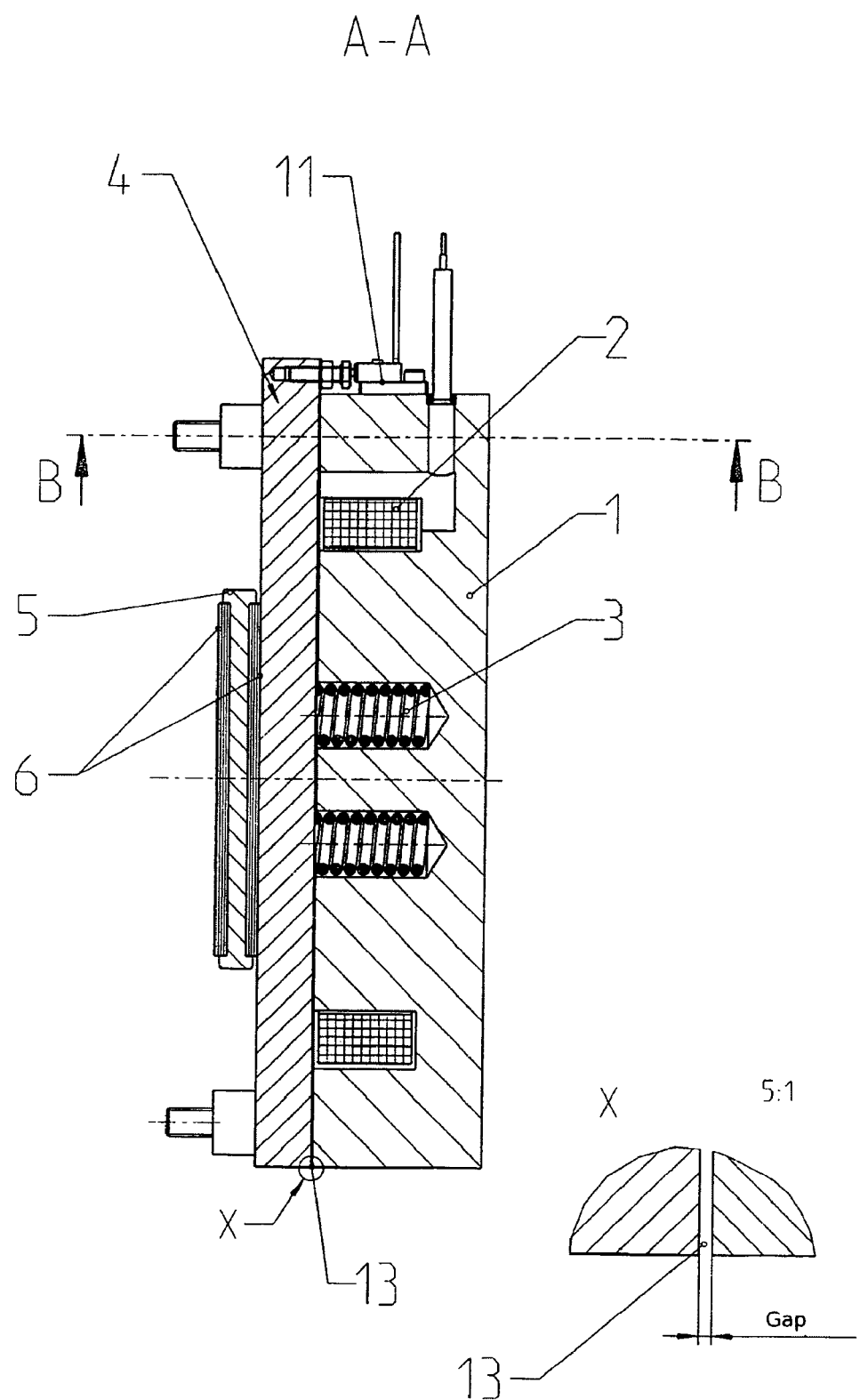
FIG. 2 shows a section A-A through right brake "b".
Figure 4:
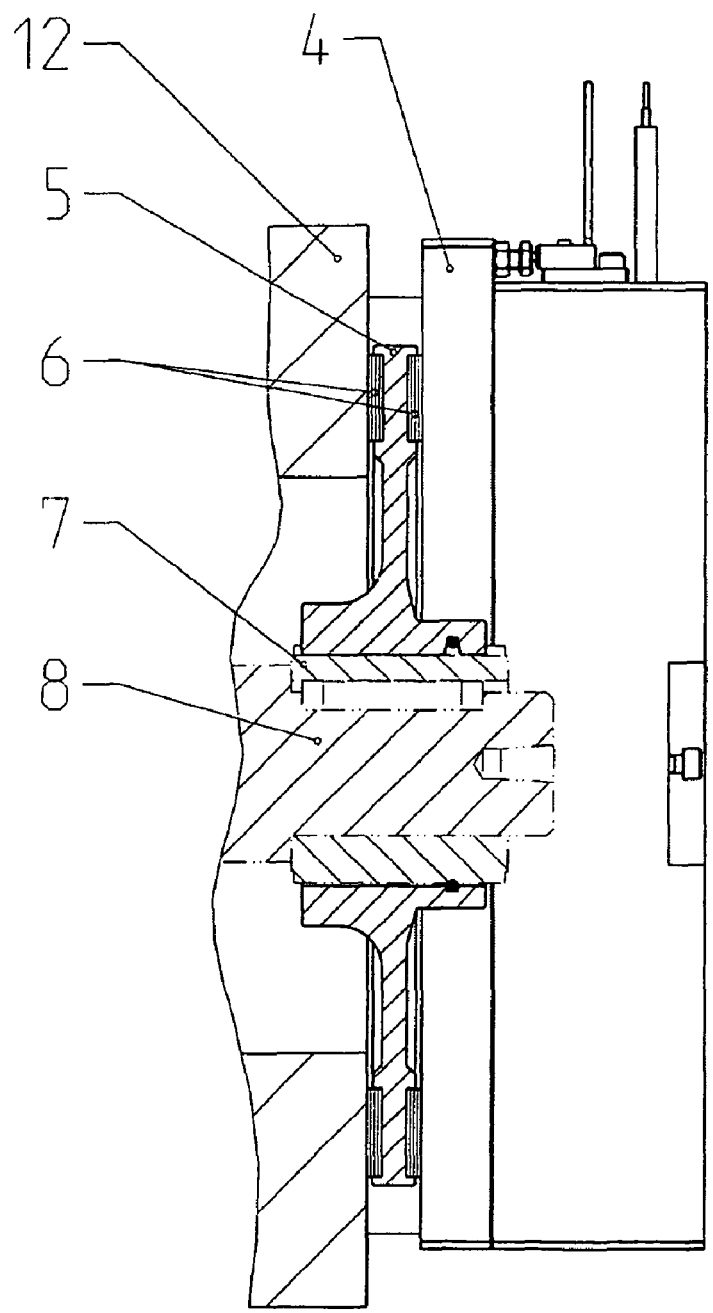
FIG. 4 shows a section C-C through the rotor and the splined hub and the output shaft of brake "b"; the section plane is shown in FIG. 1.

The operation is shown in FIG. 2:

The underlying device is a well-known spring-loaded brake, with magnetic coil 2, which is potted inside coil carrier 1, attracting (when energized) armature disc 4 across an air gap 13 against the pressure exerted by compression spring 3. As a result, rotor 5 and its two friction linings 6 are free to rotate via splined hub 7 (FIG. 4) on drive shaft 8 (FIG. 4). Whenever coil 2 is deenergized, compression springs 3 urge armature disc 4 against rotor 5 with its two friction linings 6 and onto a machine wall 12 (FIG. 4), whereby drive shaft 8 (FIG. 4) is retarded via splined hub 7 (FIG. 4).

A release monitor 11 (FIG. 2) is provided to signal the operating condition of armature disc 4, namely, whether brakes "a", "b" are engaged or disengaged.

Figure 3:
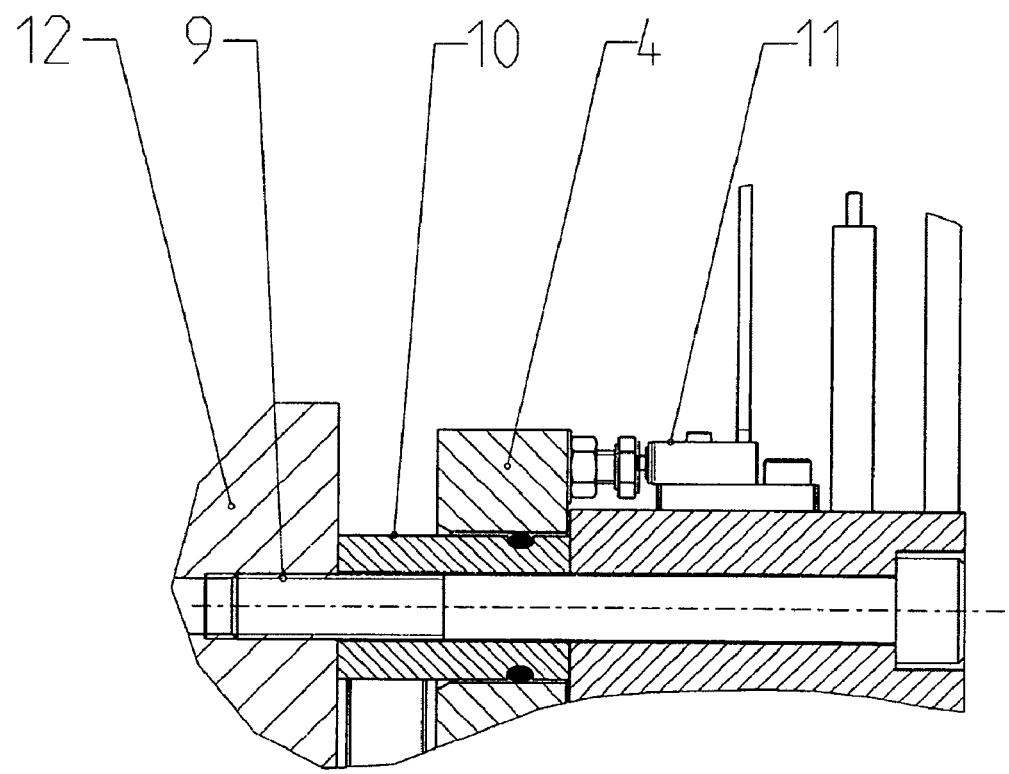
FIG. 3 shows the mounting of brake "b", with section B-B in FIG. 2 being positioned to go through the mounting elements.

FIG. 3 shows how the brake is mounted via spacer sleeves 10 on machine wall 12 by means of threaded fasteners 9.

FIG. 4 shows the attachment of brakes "a", "b" to machine wall 12 and the shaft 8 to be retarded. Splines on hub 7 and inside rotor 5 allow the latter to move freely in an axial direction and to rotate freely in the disengaged condition (armature disc 4 attracted against spring pressure 3, see FIG. 2).

Figure 5:
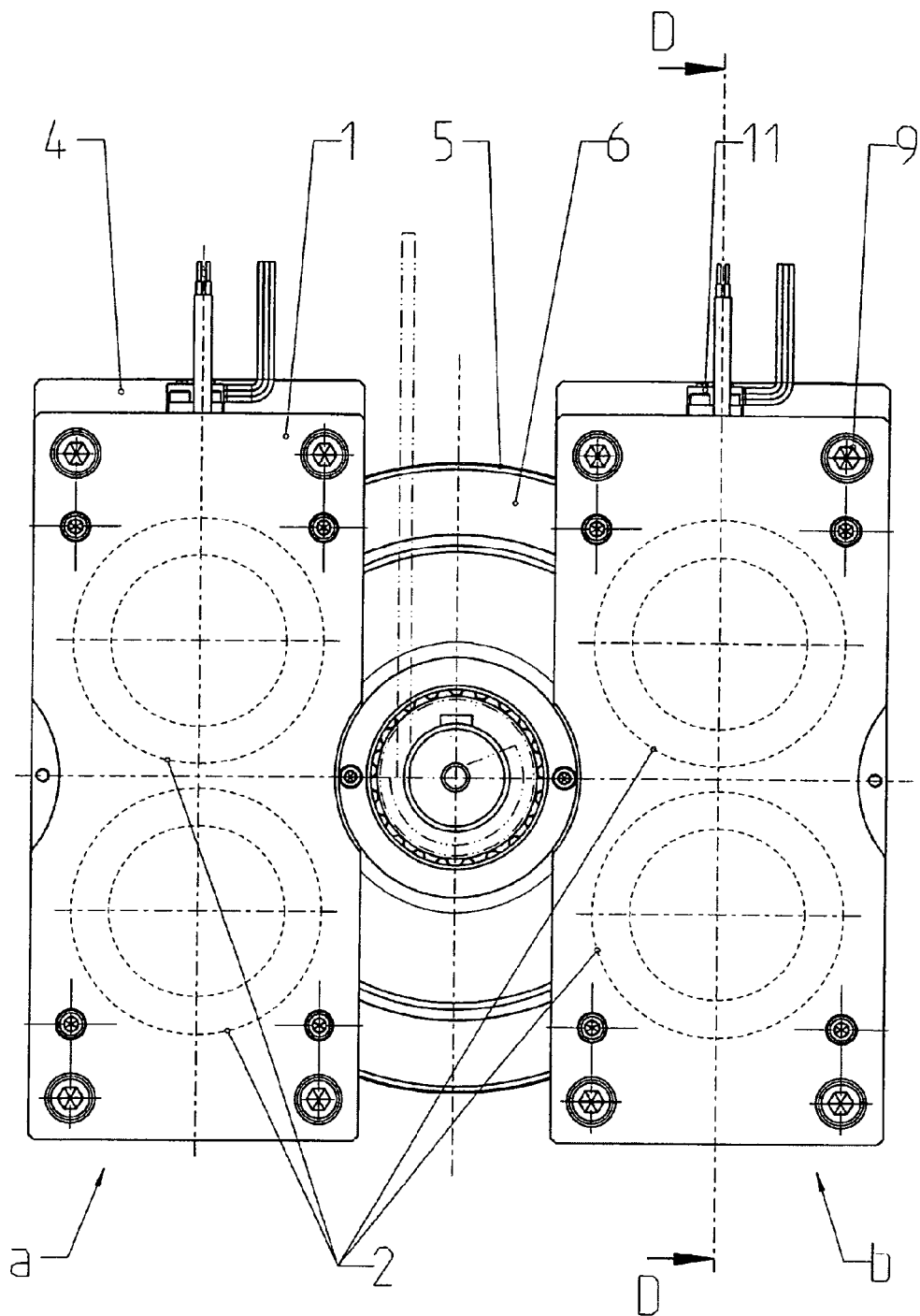
FIG. 5 shows for the pair of brakes "a", "b" an alternative coil 2 structure in the form of circularly annular coils.

FIG. 5 shows another design of brakes "a", "b" in which magnetic coil 2 is not oval in shape as shown in FIG. 1, but is divided into two circular coils for each brake. A circular coil is less costly to fabricate than an oval one.

Figure 6:
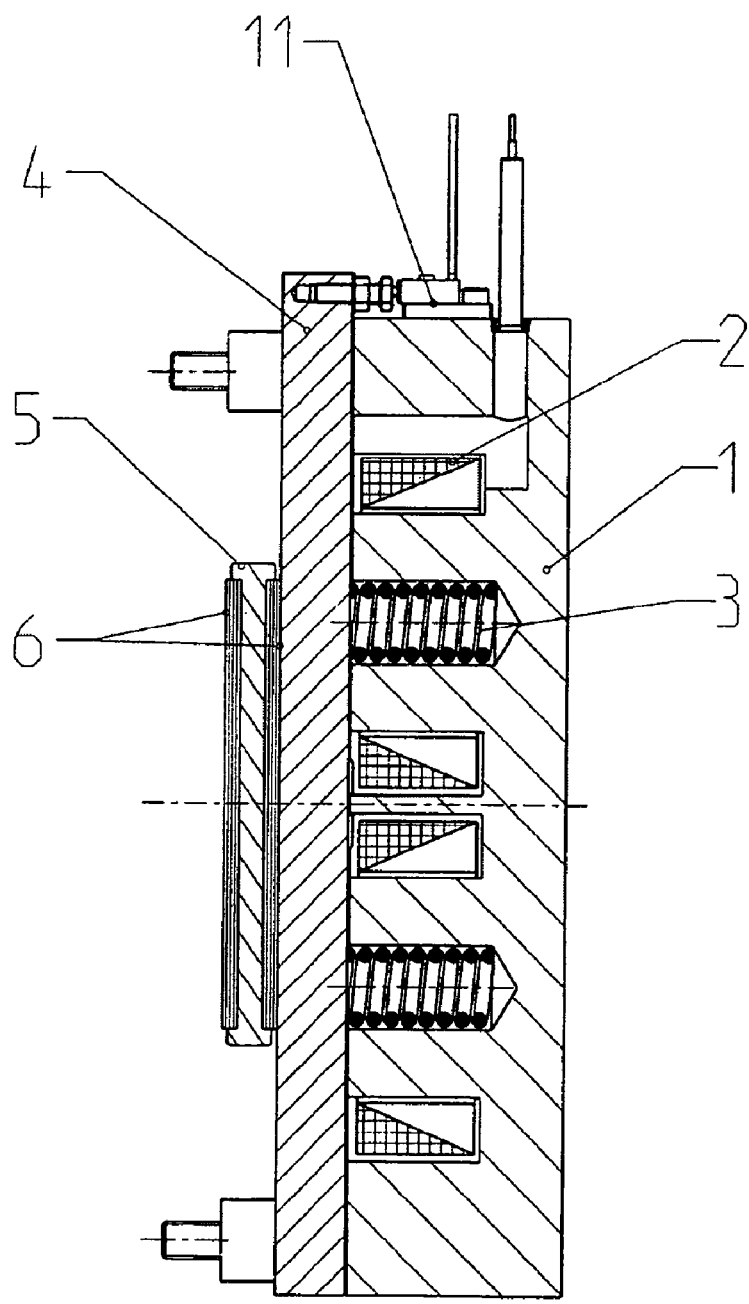
FIG. 6 shows a section D-D placed through FIG. 5.

FIG. 6 shows a section through the two circular coils.

Figure 7:
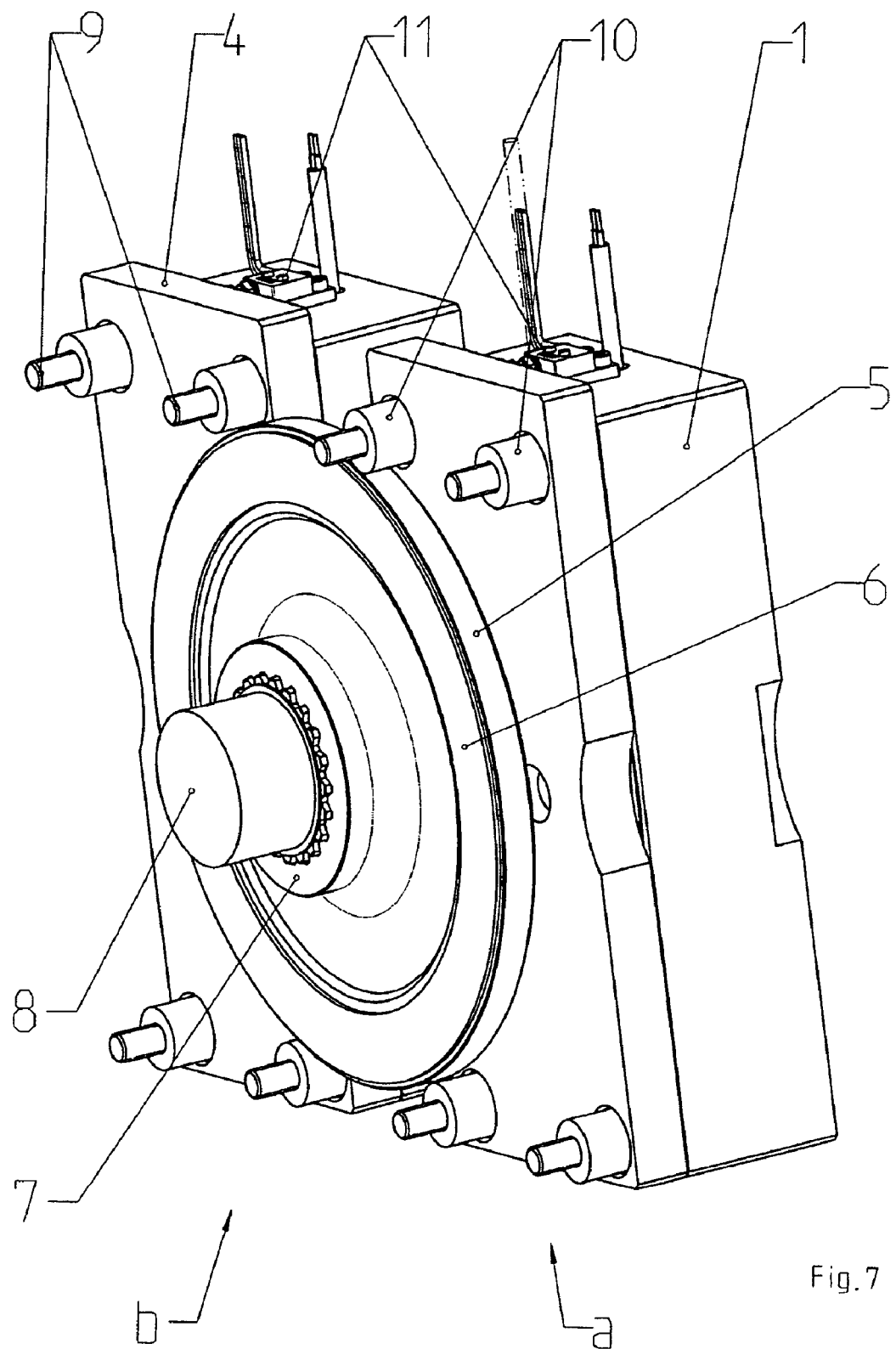
FIG. 7 shows an isometric view depicting both brakes "a", "b" and the associated rotor 5 cooperating with both brakes.

In FIG. 7 is an isometric view again showing both brakes "a", "b" capable of operating independently from each other but acting on the same rotor 5 with its friction linings 6. Either brake can be energized separately, with each by itself generating 50%, and both together providing 100%, of the total braking torque.

As a consequence, failure of one brake—e.g. by the armature disc getting stuck—will result in the second brake still providing 50% of the total torque.

Figure 8:
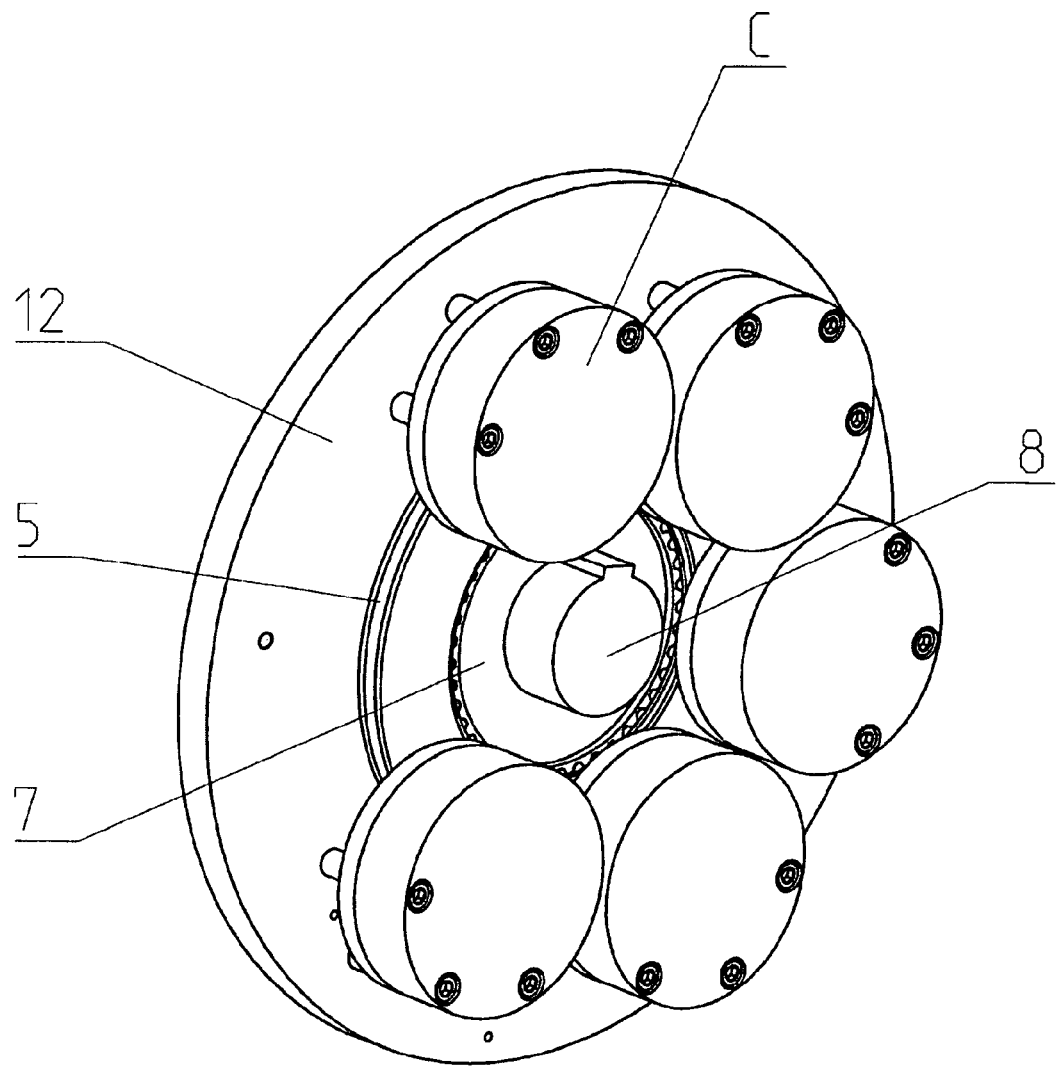
FIG. 8 shows an alternative design comprising several spring-loaded brakes distributed along the periphery of an outer face.

FIG. 8 shows the possibility of having a plurality of circular spring-loaded brakes each comprising a circular armature disc act on rotor 5. This allows the torque to be variable so that, if one brake fails, several others are available to provide more than 50% of the total torque. In FIG. 8, one brake was omitted so as to show the operation more clearly.

LIST OF REFERENCE CHARACTERS 1 coil carrier
2 coil
3 compression springs
4 armature disc
5 rotor
6 friction linings (facing a machine wall and the armature disc, respectively)
7 splined hub
8 drive shaft 9 threaded fasteners
10 spacer sleeves
11 release monitor
12 machine wall
13 air gap

The invention claimed is:

1. A segment brake comprising an axially moveable brake rotor for connection to a rotary output shaft of a machine, said rotor having friction liners on opposite axially facing sides of said rotor and a plurality of electromagnetically disengaging spring pressure brakes for attachment to a wall of a machine having a rotary shaft to be braked, said brakes being radially spaced from the axis of rotation of said rotor and each having a coil carrier, at least one electrically energizable coil in said carrier and an axially moveable spring biased armature disc retractable toward said carrier against spring pressure by electric energization of said coil, said armature disc engageable during braking with one friction liner on said rotor and an oppositely facing friction liner on said rotor being engageable during braking with said wall, said armatures and coil carriers being rectangular in shape, each coil carrier containing an oval shaped coil configured to optimize the use of available space.

2. The segment brake of claim 1, further comprising threaded fasteners for attaching said brakes to said wall.

3. The segment brake of claim 2, further comprising a splined hub affixed to said rotor.

4. The segment brake of claim 1, further comprising disengagement monitoring means for indicating engagement or disengagement of said brakes.

5. A segment brake comprising an axially moveable brake rotor for connection to a rotary output shaft of a machine, said rotor having friction liners on opposite axially facing sides of said rotor and a plurality of electromagnetically disengaging spring pressure brakes for attachment to a wall of a machine having a rotary shaft to be braked, said brakes being radially spaced from the axis of rotation of said rotor and each having a coil carrier, at least one electrically energizable coil in said carrier and an axially moveable spring biased armature disc retractable toward said carrier against spring pressure by electric energization of said coil, said armature disc engageable during braking with one friction liner on said rotor and an oppositely facing friction liner on said rotor being engageable during braking with said wall, said armatures and coil carriers being rectangular in shape, and said coil carriers each containing two annular magnetic coils configured to optimize the available space.

6. The segment brake of claim 5, further comprising threaded fasteners for attaching said brakes to said wall.

7. The segment brake of claim 6, further comprising a splined hub affixed to said rotor.

8. The segment brake of claim 5, further comprising disengagement monitoring means for indicating engagement or disengagement of said brakes.

* * * * *